Patented Dec. 28, 1948

2,457,701

UNITED STATES PATENT OFFICE 2,457,701

EMULSION-POLYMERIZATION OF BUTADIENE-1,3 HYDROCARBONS

Charles D. McCleary, Naugatuck, Conn., assignor to United States Rubber Company, New York, N. Y., a corporation of New Jersey No Drawing. Application November 2, 1945, Serial No. 626,444

20 Claims. (Cl. 260—86.5)

This invention relates to improvements in the emulsion-polymerization of butadiene-1,3 hydrocarbons and mixtures of butadiene-1,3 hydrocarbons with compounds which are copolymerizable therewith.

This application is a continuation-in-part of application Serial No. 505,240, filed October 6, 1943 and now abandoned.

A primary object of the invention is to provide means for securing a soft and easily processible synthetic rubber from the emulsion-polymerization of butadiene-1,3 hydrocarbons and from mixtures of butadiene-1,3 hydrocarbons and materials such as styrene and acrylonitrile which are copolymerizable with such butadiene-1,3 hydrocarbons. Other objects will be apparent from the following description.

It is known to produce synthetic rubbers by the emulsion polymerization of butadiene-1,3 hydrocarbons and the emulsion copolymerization of butadiene-1,3 hydrocarbons with copolymerizable material, such as styrene and acrylonitrile at elevated pressure in the presence of an oxidizing catalyst, such as alkali metal perborate, alkali metal persulfate, hydrogen peroxide, benzoyl peroxide or the like, together with a mercaptan regulator, such as an aliphatic mercaptan having 6 to 18 carbon atoms, or an aromatic mercaptan, stopping the polymerization short of completion, destroying any remaining oxidizing catalyst, if desired, as by the addition of a reducing agent such as sodium bisulfite, removing unreacted monomers, and recovering the synthetic rubber from the emulsion by conventional means such as flocculation, washing, filtering and drying. An antioxidant is generally added after the emulsion polymerization and before recovering the synthetic rubber. After the desired polymerization, some or all of the unreacted monomers that are gaseous at atmospheric pressure are usually vented off as a gas on reduction of the pressure to atmospheric pressure, and the higher boiling point monomers are then removed by steam or vacuum distillation.

By the present invention, the viscosity of synthetic rubber-like materials prepared by the emulsion-polymerization of butadiene-1,3 hydrocarbons and the emulsion-copolymerization of butadiene-1,3 hydrocarbons and materials which are copolymerizable therewith may be materially reduced so that a softer and more readily processible material is obtained. I have found that the addition of a quinone to the polymer emulsion after the desired polymerization has taken place and while the emulsion contains unreacted monomeric material, reduces considerably the viscosity of the synthetic rubber recovered from the polymer emulsion by the usual procedures of flocculation, washing, filtering, drying and the like.

The quinone should not be added until after the emulsion has been polymerized to the desired extent since quinones are severe retarders of the emulsion polymerization. For example, in a conventional polymerization of an emulsion of 75 parts of butadiene-1,3 (all parts are by weight), 25 parts of sytrene, 200 parts of water, 7.5 parts of soap (emulsifying agent), 0.3 part of potassium persulfate (oxidizing catalyst), and 0.4 part of dodecyl mercaptan (regulator), for 17.5 hours at 45° C., there is obtained a 68% conversion of the monomeric butadiene-1,3 and styrene into the copolymer. When 0.18 part of parabenzoquinone were added to the emulsion of the monomers, no polymerization occurred even after 65 hours at 45° C. At 65 hours at 45° C., the conversion of the emulsion without the quinone was 98%. In a similar emulsion polymerization of 100 parts of butadiene-1,3 in 200 parts of water containing 5 parts of soap, 0.3 part of potassium persulfate, and 1 part of dodecyl mercaptan, 80 to 90% conversion was obtained in 24 hours at 45° C., whereas the addition of .1 part of parabenzoquinone per 100 parts of butadiene-1,3 before the polymerization reduced the conversion in the same 24 hours at 45° C. to less than 20%.

The quinone is preferably added as soon after the polymerization as practicable. If the synthetic rubber latex is to be stored before the venting of unreacted low boiling monomers, such as butadiene, and the steam or vacuum distilling of higher boiling monomers, such as styrene, the quinone is preferably added before storing. If the reaction chamber is vented after the polymerization to remove such low boiling unreacted monomers, and there remains such higher boiling monomers, the quinone may be added after the venting, and before storage or steam or vacuum distillation, and a softer rubber will still be obtained than where no quinone is added before the steam or vacuum distillation. In any case, the quinone should be added to the emulsion after polymerization and while the emulsion still contains unreacted monomeric material. The quinone may be unsubstituted or substituted and have a single or condensed benzene nucleus. The amount of quinone may range from .05 to 1 part by weight per 100 parts by weight of polymerizable material originally present in the emulsion, although smaller or larger amounts may be employed to give effective reduction in the viscosity of the synthetic rubber produced.

The polymerizable material for the preparation of the synthetic rubber latex may be a butadiene-1,3 hydrocarbon, for example, butadiene-1,3, 2-methyl butadiene-1,3 (isoprene), 2,3-dimethyl butadiene-1,3, piperylene, or a mixture of such butadiene-1,3 hydrocarbons with other polymerizable compounds which are capable of forming rubbery copolymers with butadiene-1,3 hydrocarbons, for example, up to 70% by weight of such mixture of a compound which contains a $CH_2=C<$ group where at least one of the disconnected valences is attached to an electroactive group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene and vinyl naphthylene, the alpha methylene carboxylic acids and their esters, nitriles and amides, such as acrylic acid, methyl acrylate, methyl methacrylate, acroylonitrile, methacrylonitrile, methacrylamide; methyl vinyl ether; methyl vinyl ketone; vinylidene chloride.

The following examples are given in illustration of the invention, the parts referred to therein being by weight:

*Example I*

75 parts of butadiene-1,3 and 25 parts of styrene having dissolved therein .5 part of dodecyl mercaptan, a conventional regulator, were emulsified in a solution of 7.3 parts of ordinary soap and 0.29 part of potassium persulphate and 200 parts of water. This aqueous alkaline emulsion was gently agitated to maintain the preformed emulsion and heated for 16 to 20 hours at 40° C. to 45° C. in a closed vessel to copolymerize the butadiene-1,3 and styrene. The vessel was vented to reduce the pressure and remove gaseous unreacted butadiene-1,3 monomer. The product in the vessel consisted of a stable aqueous dispersion of the copolymer particles, or synthetic rubber latex, containing unreacted styrene monomer. To the copolymer dispersion was added an aqueous emulsion containing .5 part of a conventional antioxidant "BLE," which is an acetone-diphenylamine reaction product. The synthetic rubber latex was then divided into 5 portions. One portion used as a control was not further treated before steam distillation. To one portion was added .12 part sodium bisulphite based on 100 parts by weight of the butadiene-1,3 and styrene in the original emulsion to reduce any remaining potassium persulphate catalyzer as in conventional practice. Various amounts of parabenzoquinone were added to each of the remaining three portions, namely, .12 part, .29 part, and .58 part, respectively, per 100 parts by weight of butadiene-1,3 and styrene in the original emulsion. The sodium bisulphite and quinone were added in convenient aqueous solution form. Each portion was then submitted to steam distillation until the distillate was free of monomeric styrene, and the latex was flocculated by the addition of salt and acid in the conventional manner. The resultant crumbly flocs were washed, filtered and dried. Viscosity measurements were run on the crude synthetic rubber thus produced from each of the five latex portions. Samples of each of the five synthetic rubbers were compounded in a typical tire tread formula containing 50 parts of carbon black per 100 parts of the synthetic rubber and viscosity measurements were run on the thus compounded stocks. The viscosity measurements were made on a Mooney shearing disc plastometer. The device has been described by M. Mooney in Industrial & Engineering Chemistry, Analytical Edition, 6, 147 (1934). By means of this device the viscosity of the plastic material in shear may be readily and quantitatively measured. The viscosities are measured at 180° F. and the results are given in arbitrary units. The lower the viscosity readings, the softer the compound.

The following table gives the results of the viscosity tests. In the first column is set forth the material added to the copolymer emulsion before removal of the unreacted monomeric styrene, and the parts of such compound based on 100 parts of butadiene-1,3 and styrene in the original emulsion.

| Added Material | Mooney Viscosity at 180° F. | |
| --- | --- | --- |
| | Crude Synthetic Rubber | Carbon Black Compounded |
| None (control) | 76 | 111 |
| .12 part sodium bisulphite | 71 | 104 |
| .12 part parabenzoquinone | 53 | 81 |
| .29 part parabenzoquinone | 52 | 81 |
| .58 part parabenzoquinone | 54 | 80 |

It may be seen from the above table that the addition of parabenzoquinone after polymerization according to the present invention materially reduces the viscosity of the synthetic rubber-like material produced by the copolymerization in aqueous emulsion of butadiene-1,3 and styrene. The various compounds containing the carbon black and made up to a typical tire tread formula were vulcanized for 60 minutes at 45 lbs. steam pressure and gave comparable tensile strengths, elongations and permanent set values.

The production of a softer rubber by the process of the present invention is characteristic of quinones in general. Examples of other quinones that may be added to the copolymer emulsion before removal of the unreacted monovinyl compound are naphthoquinone-1,4, 2,3-dichlor naphthoquinone-1,4, tetrachloro-para-benzoquinone, ortho methyl-para-benzoquinone, ortho xyloquinone, meta-xylo para-quinone.

*Example II*

A synthetic rubber latex was prepared according to the process of Example I through the addition of the "BLE" antioxidant. The latex was divided into five portions, and there was added to one each of the portions an amount of one of the following chemicals equivalent to .3 part per 100 parts by weight of original butadiene-1,3 and styrene in the emulsion: sodium bisulphite, parabenzoquinone, naphthoquinone-1,4, tetrachloro-para-benzoquinone, ortho methyl-para-benzoquinone. The various portions of the synthetic latex were steam distilled to remove unreacted styrene and further processed, as described in Example I to produce the various samples of crude synthetic rubber. Mooney viscosities were run on the various crude rubbers as such and after compounding with 50 parts of carbon black per 100 parts of the crude rubber in a typical tire tread formula, similarly to the synthetic rubbers of Example I. The viscosities are as shown in the following table, the first column showing the material added before removal of the unreacted styrene:

| Added Material | Mooney Viscosity at 180° F. | |
| --- | --- | --- |
| | Crude Synthetic Rubber | Carbon Black Compounded |
| .3 part sodium bisulphite | 68 | 90 |
| .3 part parabenzoquinone | 54 | 63 |
| .3 part naphthoquinone-1,4 | 55 | 60 |
| .3 part tetrachlor-parabenzoquinone | 54 | 60 |
| .3 part ortho methyl-parabenzoquinone | 50 | 59 |

*Example III*

A synthetic rubber latex was prepared by polymerizing for 24 hours at 45° C. an aqueous emulsion of 100 parts of butadiene-1,3 in 200 parts of water containing 5 parts of soap, 0.3 part of potassium persulfate and 1 part of dodecyl mercaptan. At the termination of the run and before venting the unreacted butadiene-1,3 monomer, 0.1 part of parabenzoquinone per 100 parts of the original butadiene-1,3 was added to a portion of the emulsion polymerizate, and no addition was made to another portion. The monomeric butadiene-1,3 was then removed from both portions and the butadiene rubbers were coagulated and dried in the conventional manner. Mooney viscosities were run on the two rubbers and the Mooney viscosity at 180° F. of the rubber obtained from the latex to which no quinone was added was 39, whereas the Mooney viscosity on the rubber from the latex where the quinone was added before removing the monomeric butadiene was 15.

*Example IV*

A synthetic rubber latex was prepared by polymerizing for 15½ hours at 45° C. an aqueous emulsion of 75 parts of butadiene-1,3 and 25 parts of styrene in 200 parts of water containing 5 parts of soap, 0.3 part potassium persulfate and 0.45 part of dodecyl mercaptan. The latex was divided into three portions. To one portion, 0.1 part of parabenzoquinone per 100 parts of original polymerizable materials was added before removal of the unreacted butadiene and styrene. To a second portion, 0.1 part of parabenzoquinone per 100 part of original polymerizable materials was added immediately after removal of the unreacted butadiene and styrene. No addition of parabenzoquinone was made to the third portion before or after the removal of the unreacted butadiene and styrene. The unreacted butadiene and styrene monomers were removed by venting and steam distilling at the end of the 15½ hour polymerization reaction, and samples of each of the three latices thus stripped of unreacted monomers were immediately coagulated, washed and dried in the conventional manner. Mooney viscosities were run on the rubbers thus prepared. The results are shown in the following table:

| Conditions of Latex Preparation (i. e. quinone addition) | Mooney Viscosity at 180° F. on the Crude Synthetic Rubber |
| --- | --- |
| Quinone added after polymerization and before removing unreacted butadiene and styrene | 51 |
| Quinone added after removal of unreacted butadiene and styrene | 79 |
| No quinone added | 77 |

The above table clearly shows that the addition of the quinone to the emulsion before removal of unreacted monomeric materials gives a softer rubber than where the quinone is added after removal of unreacted monomers or where no quinone is added. The addition of hydroquinone to a synthetic rubber latex immediately after polymerization in slight excess of the amount necessary to reduce residual oxidizing catalyst to improve ageing of the latex is shown in Dennstedt U. S. Patent No. 2,323,313. Dennstedt, however, must add the hydroquinone to his latex when there are no unreacted monomers present in his latex, since the hardness of his rubber coagulated from the latex immediately after polymerization without hydroquinone addition is the same hardness as the rubber coagulated from the latex to which the hydroquinone has been added and the latex stored for 14 days before coagulation. In other words, Dennstedt does not improve the crude rubber, but merely permits storage of his latex before coagulation without ageing of the latex. The above table clearly shows that the present invention is a decided improvement over Dennstedt since by the present invention there is obtained a fundamentally softer rubber than is obtained by the addition of quinone after removal of unreacted monomers or where no quinone is added to the latex.

The synthetic rubber-like material of the invention may be used alone or in combination with natural rubber or other synthetic rubbers to give vulcanized rubber articles, such as tires, tubes, footwear, etc.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the preparation of a synthetic rubber latex by the polymerization of an aqueous emulsion of polymerizable material selected from the group consisting of butadiene-1,3 hydrocarbons and mixtures of butadiene-1,3 hydrocarbons with up to 70% by weight of the mixture of compounds which contain a $CH_2=C<$ group where at least one of the disconnected valences is attached to an electro-active group and which compounds are copolymerizable therewith, the step of adding .05 to 1 part by weight of a quinone per 100 parts of polymerizable material originally present, to the emulsion after polymerization of polymerizable material in the emulsion to synthetic rubber and while said emulsion contains unreacted polymerizable monomeric material.

2. In the preparation of a synthetic rubber latex by the polymerization of an aqueous emulsion of polymerizable material selected from the group consisting of butadiene-1,3 hydrocarbons and mixtures of butadiene-1,3 hydrocarbons with up to 70% by weight of the mixture of compounds which contain a $CH_2=C<$ group where at least one of the disconnected valances is attached to an electro-active group and which compounds are copolymerizable therewith, the step of adding .05 to 1 part by weight of parabenzoquinone per 100 parts of polymerizable material originally present, to the emulsion after polymerization of polymerizable material in the emulsion to synthetic rubber and while said emulsion contains unreacted polymerizable monomeric material.

3. In the preparation of a synthetic rubber latex by the polymerization of an aqueous emulsion of polymerizable material selected from the group consisting of butadiene-1,3 hydrocarbons and mixtures of butadiene-1,3 hydrocarbons with up to 70% by weight of the mixture of compounds which contain a $CH_2=C<$ group where at least one of the disconnected valences is attached to an electro-active group and which compounds are copolymerizable therewith, the step of adding .05 to 1 part by weight of naphthoquinone-1,4 per 100 parts of polymerizable material originally present, to the emulsion after polymerization of polymerizable material in the emulsion to synthetic rubber and while said emulsion contains unreacted polymerizable monomeric material.

4. In the preparation of a synthetic rubber latex by the polymerization of an aqueous emulsion of polymerizable material selected from the group consisting of butadiene-1,3 hydrocarbons and mixtures of butadiene-1,3 hydrocarbons with up to 70% by weight of the mixture of compounds which contain a $CH_2=C<$ group where at least one of the disconnected valences is attached to an electro-active group and which compounds are copolymerizable therewith, the step of adding .05 to 1 part by weight of tetrachloroparabenzoquinone per 100 parts of polymerizable material originally present, to the emulsion after polymerization of polymerizable material in the emulsion to synthetic rubber and while said emulsion contains unreacted polymerizable monomeric material.

5. In the preparation of a synthetic rubber latex by the polymerization of an aqueous emulsion of a mixture of a butadiene-1,3 hydrocarbon and up to 70% by weight of the mixture of a compound which contains a $CH_2=C<$ group where at least one of the disconnected valences is attached to an electro-active group and which compound is copolymerizable therewith, the step of adding to the emulsion .05 to 1 part by weight of a quinone per 100 parts by weight of polymerizable material originally present in the emulsion after polymerization of polymerizable material in the emulsion to synthetic rubber and while said emulsion contains unreacted polymerizable monomeric material.

6. In the preparation of a synthetic rubber latex by the polymerization of an aqueous emulsion of a mixture of a butadiene-1,3 hydrocarbon and up to 70% by weight of the mixture of a compound which contains a $CH_2=C<$ group where at least one of the disconnected valences is attached to an electro-active group and which compound is copolymerizable therewith, the step of adding to the emulsion .05 to 1 part by weight of parabenzoquinone per 100 parts by weight of polymerizable material originally present in the emulsion after polymerization of polymerizable material in the emulsion to synthetic rubber and while said emulsion contains unreacted polymerizable monomeric material.

7. In the preparation of a synthetic rubber latex by the polymerization of an aqueous emulsion of a mixture of a butadiene-1,3 hydrocarbon and up to 70% by weight of the mixture of a compound which contains a $CH_2=C<$ group where at least one of the disconnected valences is attached to an electro-active group and which compound is copolymerizable therewith, the step of adding to the emulsion .05 to 1 part by weight of napthoquinone-1,4 per 100 parts by weight of polymerizable material originally present in the emulsion after polymerization of polymerizable material in the emulsion to synthetic rubber and while said emulsion contains unreacted polymerizable monomeric material.

8. In the preparation of a synthetic rubber latex by the polymerization of an aqueous emulsion of a mixture of a butadiene-1,3 hydrocarbon and up to 70% by weight of the mixture of a compound which contains a $CH_2=C<$ group where at least one of the disconnected valences is attached to an electro-active group and which compound is copolymerizable therewith, the step of adding to the emulsion .05 to 1 part by weight of tetracloroparabenzoquinone per 100 parts by weight of polymerizable material originally present in the emulsion after polymerization of polymerizable material in the emulsion to synthetic rubber and while said emulsion contains unreacted polymerizable monomeric material.

9. The method of preparing a synthetic rubber latex which comprises subjecting an aqueous emulsion of polymerizable material selected from the group consisting of butadiene-1,3 hydrocarbons and mixtures of butadiene-1,3 hydrocarbons with up to 70% by weight of the mixture of compounds which contain a $CH_2=C<$ group where at least one of the disconnected valences is attached to an electro-active group and which compounds are copolymerizable therewith, to polymerization of the polymerizable material to synthetic rubber in the presence of an oxidizing catalyst, allowing the polymerization to stop after formation of the synthetic rubber and while the emulsion contains unreacted polymerizable monomeric material, adding .05 to 1 part by weight of a quinone per 100 parts of polymerizable material originally present, to the emulsion after said stopping of the polymerization and while the emulsion contains unreacted polymerizable monomeric material, and thereafter removing said monomeric material.

10. The method of claim 9 in which the quinone is parabenzoquinone.

11. The method of claim 9 in which the quinone is naphthoquinone-1,4.

12. The method of claim 9 in which the quinone is tetrachloroparabenzoquinone.

13. The method of preparing a synthetic rubber latex which comprises subjecting an aqueous emulsion of a mixture of butadiene-1,3 and a compound which contains a $CH_2=C<$ group where at least one of the disconnected valences is attached to an electro-active group and is copolymerizable therewith and which is present in amount up to 70% by weight of the mixture, to polymerization of the polymerizable material to synthetic rubber in the presence of an oxidizing catalyst, allowing the polymerization to stop after formation of the synthetic rubber and while the emulsion contains unreacted polymerizable monomeric material, adding .05 to 1 part by weight of a quinone per 100 parts of polymerizable material originally present to the emulsion after said stopping of the polymerization and while the emulsion contains unreacted polymerizable monomeric material, and thereafter removing said monomeric material.

14. The method of claim 13 in which the quinone is parabenzoquinone.

15. The method of claim 13 in which the quinone is naphthoquinone-1,4.

16. The method of claim 13 in which the quinone is tetrachloroparabenzoquinone.

17. The method of preparing a synthetic rubber latex which comprises subjecting an aqueous emulsion containing a mixture of butadiene-1,3 and up to 70% of said mixture of styrene to polymerization in the presence of an oxidizing catalyst, allowing the polymerization to stop after formation of the synthetic rubber and while the emulsion contains unreacted styrene monomer, adding to the emulsion after said stopping of the polymerization and before removal of the unreacted styrene monomer, .05 to 1 part by weight of a quinone per 100 parts by weight of polymerizable material originally present in the emulsion, and thereafter removing unreacted monomeric material.

18. The method of claim 17 in which the quinone is parabenzoquinone.

19. The method of claim 17 in which the quinone is napthoquinone-1,4.

20. The method of claim 17 in which the quinone is tetrachloroparabenzoquinone.

CHARLES D. McCLEARY.

REFERENCES CITED

The following references are of record in the file of this patent:

FOREIGN PATENTS

| Number | Country | Date |
|--------|---------|------|
| 541,296 | Great Britain | Nov. 21, 1941 |